(12) United States Patent
Sinner et al.

(10) Patent No.: US 11,201,575 B2
(45) Date of Patent: Dec. 14, 2021

(54) MONITORING DEVICE FOR A RELUCTANCE MACHINE AND METHOD FOR MONITORING

(71) Applicant: Siemens Aktiengesellschaft, Munich (DE)

(72) Inventors: Harald Sinner, Eckental/Eckenhaid (DE); Thilo Weigel, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/649,529

(22) PCT Filed: Sep. 13, 2018

(86) PCT No.: PCT/EP2018/074708
§ 371 (c)(1),
(2) Date: Mar. 20, 2020

(87) PCT Pub. No.: WO2019/057596
PCT Pub. Date: Mar. 28, 2019

(65) Prior Publication Data
US 2020/0259441 A1 Aug. 13, 2020

(30) Foreign Application Priority Data
Sep. 22, 2017 (EP) .................................. 17192677

(51) Int. Cl.
*H02P 25/089* (2016.01)
*H02P 21/18* (2016.01)
*H02P 21/14* (2016.01)

(52) U.S. Cl.
CPC .......... *H02P 25/089* (2016.02); *H02P 21/141* (2013.01); *H02P 21/18* (2016.02)

(58) Field of Classification Search
CPC ............................... H02P 25/089; H02P 21/18
(Continued)

(56) References Cited

U.S. PATENT DOCUMENTS 6,316,905 B1    11/2001  Depenbrock
8,115,428 B2 *   2/2012  Williams ............. B62D 5/0481
                                                 318/400.02
(Continued)

FOREIGN PATENT DOCUMENTS

DE         19703248 A1     8/1998
DE      102006008497 A1    8/2006
(Continued)

OTHER PUBLICATIONS

PCT International Examination Report and Written Opinion of International Examination Authority dated Oct. 12, 2018 corresponding to PCT International Application No. PCT/EP2018/074708 filed Sep. 13, 2018.

*Primary Examiner* — David Luo
(74) *Attorney, Agent, or Firm* — Henry M. Feiereisen LLC

(57) ABSTRACT

A monitoring device for a reluctance machine includes a vector rotator for rotating a space phasor of the reluctance machine that depends on a voltage in a coordinate system that rotates with a negative fundamental frequency, a low-pass filter filtering the rotated space phasor and producing an output signal, and a signal evaluation device evaluating the output signal. A DC value of the produced output signal in the rotating coordinate system is monitored, and an error in operating the reluctance machine is identified when the DC value is above a predefined threshold value.

8 Claims, 4 Drawing Sheets

(58) Field of Classification Search
USPC .................................................. 318/701, 700
See application file for complete search history.

(56) References Cited

U.S. PATENT DOCUMENTS

| | | | |
|---|---|---|---|
| 8,963,459 B2* | 2/2015 | Kim | ........................ H02P 21/18 |
| | | | 318/400.02 |
| 9,948,224 B1* | 4/2018 | Huh | ........................ H02P 21/26 |
| 2006/0193090 A1 | 8/2006 | Ho | |
| 2007/0001635 A1 | 1/2007 | Ho | |
| 2009/0039810 A1 | 2/2009 | Gotz et al. | |
| 2010/0076612 A1 | 3/2010 | Robertson | |
| 2017/0237376 A1 | 8/2017 | Saeki | |

FOREIGN PATENT DOCUMENTS

| | | |
|---|---|---|
| DE | 102013212876 A1 | 1/2015 |
| EP | 2226929 A1 | 9/2010 |
| EP | 2023479 B1 | 4/2014 |
| RU | 2519636 C2 | 6/2014 |

\* cited by examiner

MONITORING DEVICE FOR A RELUCTANCE MACHINE AND METHOD FOR MONITORING

CROSS-REFERENCES TO RELATED APPLICATIONS

This application is the U.S. National Stage of International Application No. PCT/EP2018/074708, filed Sep. 13, 2018, which designated the United States and has been published as International Publication No. WO 2019/057596 A1 and which claims the priority of European Patent Application, Serial No. 17192677.7, filed Sep. 22, 2017, pursuant to 36 U.S.C. 119(a)-(d).

BACKGROUND OF THE INVENTION

The invention relates to a reluctance machine and the monitoring thereof. A synchronous reluctance machine can be operated with open-loop or closed-loop control.

Reluctance machines may take the form of a reluctance motor or reluctance generator. In order to determine the position of the rotor (also known as the armature) of the reluctance machine, an encoder can be used. The reluctance machine may also, however, be operated without an encoder.

In order to determine the position of the rotor in an electric machine, a field-oriented control (FOC) can also be used, for example.

Known from DE 197 03 248 A1 are a method and an apparatus for determining a rotor angular velocity of an encoderless rotating-field machine operated in a field-oriented manner.

Known from EP 2 023 479 B1 is a system for seamlessly ascertaining the speed and/or position, including standstill, of a permanent magnet rotor of an electric machine. A method for ascertaining an electrical drive speed and/or position from a measurement of a multi-phase stator current is described.

Known from EP 2 226 929 A1 is a plausibility monitoring system for movement measurements at an electrical drive device. In a method for monitoring a movement measurement at an electrical drive device for plausibility, the movement measurement of an encoder is monitored. On the basis of measurements of electrical currents in the drive device, one or more estimated values for the position, speed and/or acceleration of the drive device are generated, wherein the estimated value(s) is/are compared for correspondence with one or more measured values generated from the encoder output signals.

A reluctance machine, in particular a synchronous reluctance machine, can be used in an encoderless operation. In this operating mode, the encoderless operation, the reluctance machine can be operated with open-loop control. In the open-loop controlled operation, a parameterized current is impressed. In the open-loop controlled operation, a range of low output frequencies is passed through in particular. The current is set in particular such that an anticipated moment can be applied or generated. If the amplitude of the current is too small, then the rotor is not accelerated as desired and the reluctance motor tilts or locks up. The current phasor rotates over the rotor and alternately generates a positive and a negative moment when passing over the torque axis. This is perceived as "rattling". The rotational speed remains zero on average; the rotor of the reluctance machine or a shaft which is connected to the rotor thus locks up.

An object of the invention is to operate a reluctance machine safely.

SUMMARY OF THE INVENTION

According to one aspect of the invention, the object is solved by a monitoring device for a reluctance machine including a vector rotator for rotating a space phasor of the reluctance machine dependent upon the voltage, with a low-pass filter for the rotated space phasor and a signal evaluation for the output signal of the low-pass filter, wherein the space phasor is rotated by the vector rotator into a coordinate system which rotates with negative fundamental frequency.

According to another aspect of the invention, the object is solved by a method for monitoring a reluctance machine, wherein a space phasor for the flux, which is dependent upon the voltage, is transformed into a coordinate system which rotates with negative frequency and is monitored in said system as a stationary DC value signal.

Respective embodiments are set forth in the dependent claims.

In order to avoid a "rattling" during open-loop controlled operation, a variance of the absolute current value can be monitored. At low frequencies, however, the closed-loop current controller of the reluctance machine can stabilize the resulting harmonics (in particular twice the stator frequency) well. For this reason, the monitoring can be improved further.

During closed-loop controlled operation, the difference between target and actual flux is monitored and the rotor is thus monitored. The locking-up (rattling) of the rotor, or the locking-up of a shaft connected to the rotor, can also be identified by using an encoder.

In order to identify a locking-up (rattling) of the reluctance machine or of the rotor of the reluctance machine, there is a further option. This relates in particular to the open-loop controlled operation of the reluctance machine.

The reluctance machine is assigned a current converter. A field-oriented closed-loop/open-loop control or a closed-loop current controller is provided for the closed-loop and/or open-loop control of the reluctance machine. These may also be used to monitor the reluctance machine. If a current phasor rotates over a standing shaft, then according to the following formula this results in a flux component through the complex and the complex conjugate current phasor:

$$\underline{\Psi} = \Psi_d + j\Psi_q$$

$$\underline{\Psi} = (L_\Sigma \underline{I} + L_\Delta \underline{I}^*)$$

$$L_\Sigma = 0.5 \cdot (L_d + L_q)$$

$$L_\Delta = 0.5 \cdot (L_d - L_q)$$

where:
 $\underline{\Psi}$ stands for the flux (magnetic flux)
 d stands for a d component
 q stands for a q component
 L stands for the inductivity One component of the flux $\underline{\Psi}$ therefore rotates with a positive fundamental frequency $f_{FUND}$ and one rotates with a negative fundamental frequency $f_{FUND}$. The fundamental frequency is the frequency of the current phasor.

Electrical frequencies are taken into consideration (in relation to the stator). The frequency of the flux is transformed using the number of pole pairs on the stator side. In order to adjust the desired current phasor, the closed-loop current controller generates a voltage phasor which generates a component with a negatively rotating fundamental frequency. By transforming the space phasor into a coordinate system which is rotating with a negative fundamental frequency, all frequency components are shifted by the fundamental frequency. The component produced by the complex conjugate current therefore becomes a DC component. This DC component can be filtered from the signal (overall signal) by a low-pass filter and used to detect the locked-up shaft. This consequently results in a further option for monitoring the reluctance machine.

The voltage component which occurs in the fault scenario (rattling) and rotates with a negative frequency is thus shifted to the frequency zero line by the transformation into a coordinate system rotating with a negative frequency, and thus becomes a DC value signal. The fundamental wave component of the voltage which rotates with a positive frequency and drives the machine is shifted to the line of twice the fundamental frequency by the coordinate transformation. By means of the low-pass filter, the level of the frequency zero line can be separated from the level of twice the fundamental frequency line. A stationary DC value signal thus appears at the output of the low-pass filter in the fault scenario.

A monitoring device for a reluctance machine has a vector rotator for rotating a space phasor dependent upon the voltage, a low-pass filter for the rotated space phasor and a signal evaluation for the output signal of the low-pass filter. By means of this monitoring device, a standing (rattling) shaft or stationary rotor can be identified. The space phasor which is dependent upon the voltage may, for example, be the voltage phasor, or the space phasor for the flux. The space phasor for the flux is derived from the voltage phasor. The flux phasor is the integral of the voltage phasor. The voltage phasor is the derivative of the flux phasor.

In one embodiment of the monitoring device, the space phasor is rotated by the vector rotator into a coordinate system which rotates with negative fundamental frequency.

In one embodiment of the monitoring device, the vector rotator is embodied to rotate the space phasor by a negative fundamental frequency. It can thus be ascertained whether there is a DC component. The positive fundamental frequency is the frequency of the predefined current phasor (Impressed current).

In one embodiment of the monitoring device, the space phasor is a voltage phasor. The voltage phasor corresponds to the flux phasor. The space phasor may alternatively also be the flux phasor.

In one embodiment of the monitoring device, the signal evaluation has an absolute-value generator and a threshold comparator. It is possible to ascertain a DC component by way of the low-pass filter. The absolute value is formed by this DC component of the space phasor, which relates to the flux or the voltage. The absolute value may then be compared with a threshold value. If the absolute value is above the threshold value, then an error is identified. A locking-up (rattling) of the shaft (of the rotor) is thus identified.

The locking-up (rattling) of the shaft can be identified over the entire range of rotational speed, unlike a monitoring of the variance of the current. By way of a suitable error message, an operator of the reluctance machine can be made aware of a faulty parameterization more rapidly (e.g. aware of a too-low start-up current for the open-loop controlled operation).

In a method for monitoring a reluctance machine, a space phasor for the flux, which is dependent upon the voltage, is transformed into a coordinate system which rotates with negative frequency and is monitored in said system as a stationary DC value signal. The DC value signal is accordingly a DC value and/or a DC component of a signal.

In one embodiment of the method, it is accordingly possible to detect a DC component from the flux, i.e. from the corresponding phasor. As the flux is dependent upon the voltage, the DC component is accordingly also produced on the voltage. The direct-current component of the space phasor for the flux can therefore be ascertained or monitored from a signal evaluation by means of a low-pass filter. The use of a low-pass filter has already been written above.

In a method for monitoring a reluctance machine, it is therefore possible for a space phasor for the flux or for a voltage to be monitored. The space phasor is transformed by a fundamental frequency. In particular, the transformation takes place by the negative fundamental frequency. The fundamental frequency corresponds in particular to the predefined rotational speed of the reluctance machine. In doing so, the DC component of the transformed space phasor is monitored. In regular operation, this DC component is zero or approximately zero. The DC component increases when the rotor locks up or rattles.

In one embodiment of the method, after the transformation (in particular performed by a vector rotator), the DC component which may be present in some circumstances (i.e. in the event of a locking-up or rattling) is generated or ascertained by means of a low-pass filter.

In one embodiment of the method, the DC component is compared with a threshold value and an error message is output, when the DC component of the vector-transformed space phasor reaches and/or exceeds the threshold value. A hysteresis may also additionally be used for this purpose in one embodiment.

In one embodiment of the method, the reluctance machine with the monitoring is operated as an encoderless reluctance machine. A safe operation of the reluctance machine can thus be achieved in a cost-effective manner without encoder.

In one embodiment of the method, the reluctance machine is operated in an open-loop controlled operation. This means that the start-up of the reluctance machine can also be performed safely.

The invention as well as further embodiments of the invention are described in greater detail below with reference to exemplary embodiments in the figures, in which:

DETAILED DESCRIPTION OF PREFERRED EMBODIMENTS

Figure 1:
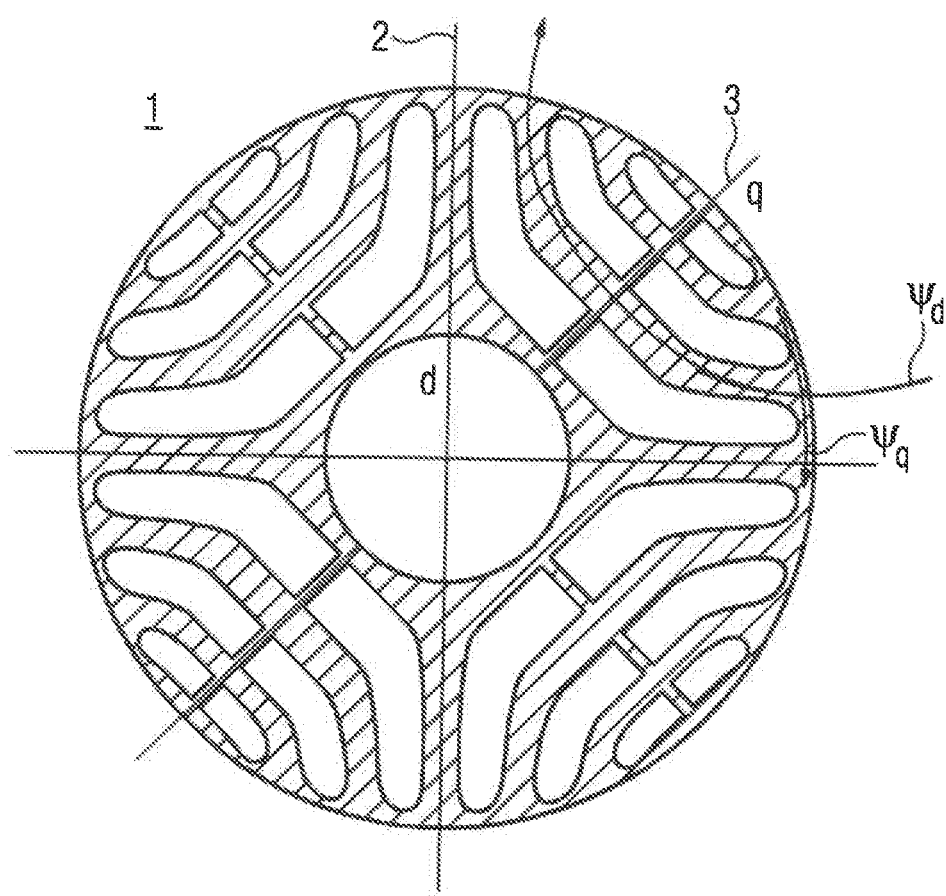
FIG. 1 shows a plate section of a rotor of a reluctance machine.

The representation according to FIG. 1 shows a rotor plate section 1 of a reluctance machine. Further shown are a pole 2 and a pole gap 3 together with the axes d and q of the flux on the basis of the Park transform. The d axis relates to the flux-forming component and the q axis relates to the moment-forming component of the overall flux. The rotor plate section 1 is a typical exemplary example of a rotor of a reluctance machine. Also shown alongside the pole 2 and the gap 3, which represent the d axis and the q axis accordingly, is the flux $\psi_d$ and the flux $\psi_q$.

Figure 2:
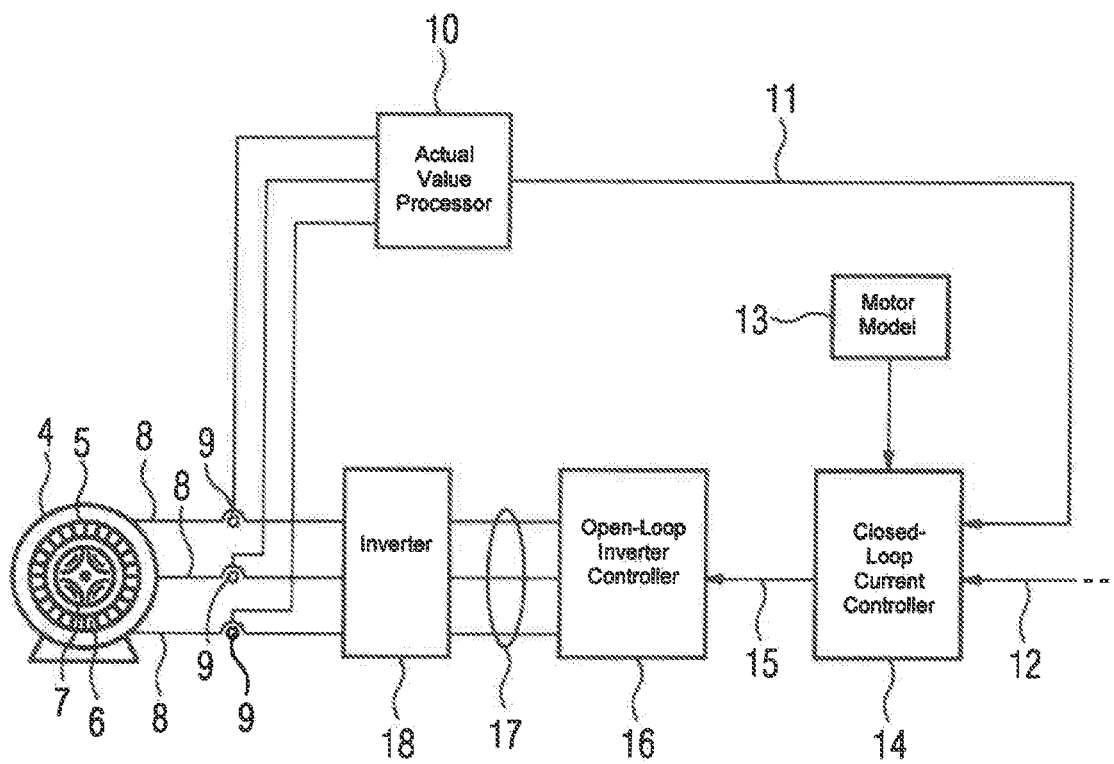
FIG. 2 shows a reluctance machine with a closed-loop current controller.

The representation according to FIG. 2 shows a reluctance machine 4 with a closed-loop current controller 14. A simplified block diagram of the closed-loop control of the reluctance machine 4 is therefore produced. The reluctance machine 4 has a stator 5 with stator slots 6, into which stator windings are inserted. Further shown is a rotor 7, the plate section of which is Indicated. The reluctance machine 4 has a three-phase current connection 8. In order to measure a current or a voltage for the phases of the current connection 8, a three-phase measured value recorder 9 is provided. The recorded measured values are processed in an actual value processor 10. The actual value processor 10 produces an actual current value $\underline{I}$. This actual current value $\underline{I}$ is an input value of the closed-loop current controller 14. A further input value of the closed-loop current controller 14 is the target current value $I_{target}$ 12. The closed-loop current controller 14 additionally has a link to a motor model 13. An output value of the closed-loop current controller 14 is the target voltage value $\underline{U}$ 15. The target voltage value $\underline{U}$ 15 is an input variable of an open-loop inverter controller 16. The open-loop inverter controller 16 has actuation signals 17 as output variables, which are supplied to an inverter 18. The inverter 18 is used to feed electrical energy to the reluctance machine 14.

Figure 3:
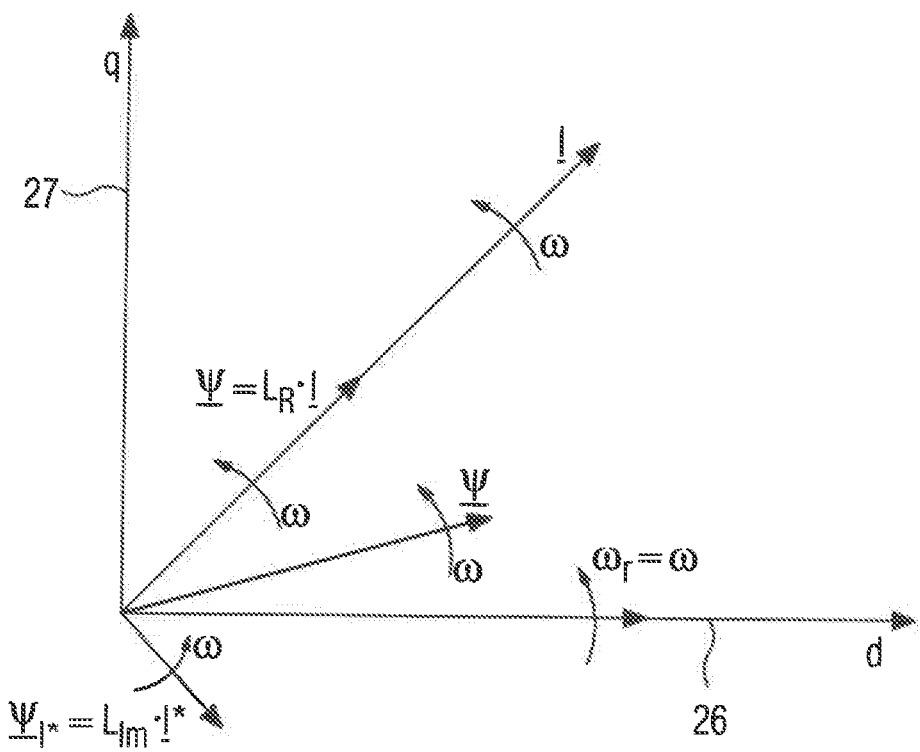
FIG. 3 shows a phasor diagram during normal operation.

The representation according to FIG. 3 shows a phasor diagram for the reluctance machine, wherein the voltage phasors are not specifically shown in the phasor diagram. The voltage phasor is produced from the temporal derivation of the flux and rotated by 90° with respect to the flux phasor. The phasor diagram is based on the representation of the d axis 26 and the q axis 27. Shown are the current phasor $\underline{I}$, the flux $\psi_I$, the flux $\underline{\psi}$ and the flux $\psi_I^*$. The space phasors move, as shown, with the electric rotor angular velocity $\omega_r$. With regard to the values shown, the following equations are produced:

$$\omega_r = \omega$$

$$\Psi_I = L_R \cdot \underline{I}$$

$$\Psi_I^* = L_{Im} \cdot \underline{I}^*$$

The representation according to FIG. 3 shows the phasor diagram of the reluctance machine during normal operation. In an operating state of the reluctance machine according to FIG. 3, no rattling or locking-up of the rotor is produced. On the basis of the equations $$\underline{\Psi} = \Psi_d + j\Psi_q$$

$$\underline{\Psi} = (L_\Sigma \underline{I} + L_\Delta \cdot \underline{I}^*)$$

$$L_\Sigma = 0.5 \cdot (L_d + L_q)$$

$$L_\Delta = 0.5 \cdot (L_d - L_q)$$

it can be seen that the d axis also rotates, as does the complex conjugate component of the flux.

Figure 4:
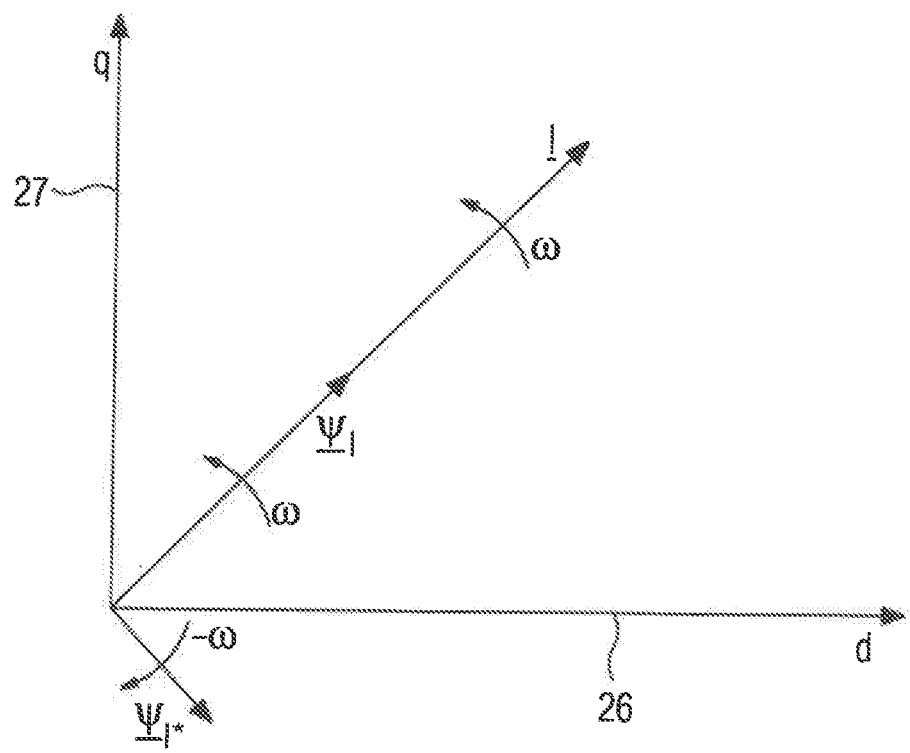
FIG. 4 shows a phasor diagram in the fault scenario (locking-up or rattling of the rotor or the shaft)

The representation according to FIG. 4 shows a further phasor diagram with the axes d 26 and q 27. Further shown are the current phasor I with the angular velocity $\omega$ and the phasor $\underline{\Psi}_I$ running thereon, as well as the phasor $\underline{\Psi}_I^*$ which has been displaced by $-\omega$ in relation thereto. Unlike the representation according to FIG. 3, the representation according to FIG. 4 does not show a normal operating state, but rather the fault scenario, in which the shaft or the rotor is locked up, i.e. rattles. The flux phasor $\underline{\Psi}_I$ rotates with the angular velocity $\omega$. The phasor $\underline{\Psi}_I^*$ rotates with the angular velocity $-\omega$. The phasors $\underline{\Psi}_I$ and $\underline{\Psi}_I^*$ therefore rotate in opposing directions. This produces a DC component, which can be detected.

Figure 5:
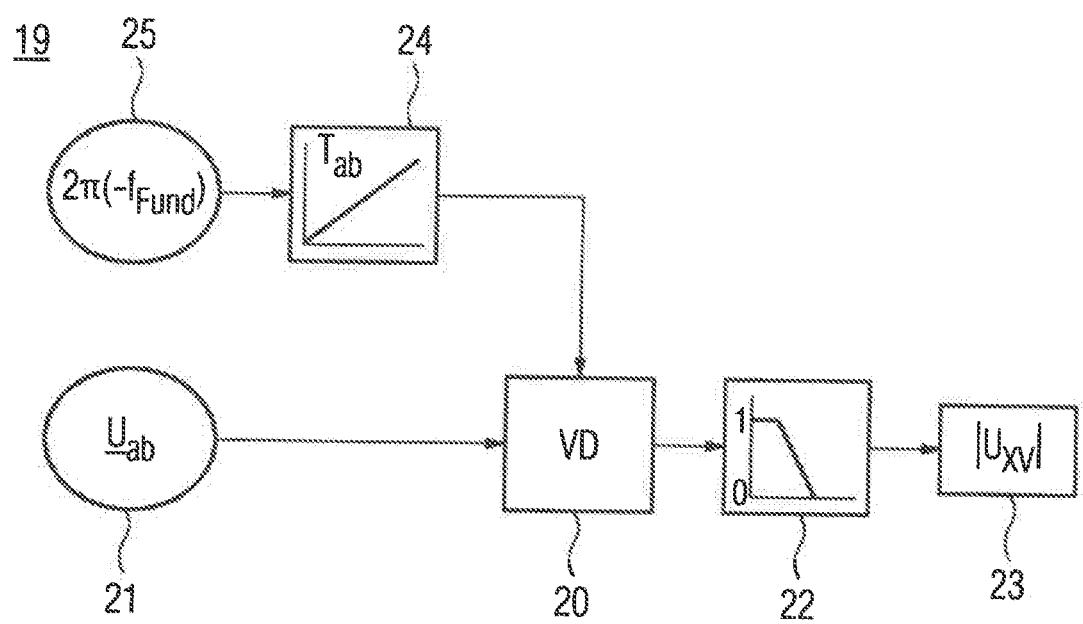
FIG. 5 shows a monitoring device.

The representation according to FIG. 5 shows a monitoring device 19. The monitoring device 19 serves to monitor the reluctance machine. The monitoring device has input signals 21 and 25. The input signal 21 is a space phasor, in particular a stator-fixed voltage phasor $\underline{U}_{ab}$ (terminal voltage of the motor). The input signal 25 is a negative angular frequency $2\pi(-f_{fund})$. Here, the fundamental frequency $f_{fund}$ is negated by the minus sign. The negative angular frequency 25 is sampled by means of a sampling with the sampling frequency $T_{ab}$. For a vector rotator 20, an integration of the input signal 25 takes place over the sampling time by means of an angular integration 24. The output signal of the angular integrator 24 is supplied to the vector rotator 20, which rotates the space phasor 21. The space phasor 21 rotated with the negative angular frequency is guided through a low-pass filter 22. The output signal of the low-pass filter 22 is further processed in a signal evaluation 23. The signal evaluation 23 is, for example, an absolute-value generator, wherein in the present case an absolute-value generation of the components of the voltage phasor $|U_{XY}|$ in the rotating coordinate system is performed. In the fault scenario, the component $L_\Sigma I$ always rotates in the positive direction, as in the normal scenario. The component $L_\Delta I^*$ rotates in the negative direction in the fault scenario. In the normal scenario, the component $L_\Delta I^*$ also rotates with a positive frequency. It is therefore the case that in the fault scenario, as in the normal scenario, the component $L_\Sigma I$ rotates in the positive frequency (direction of rotation), the conjugate component $L_\Delta I^*$ rotates in the positive direction in the normal scenario, but in the fault scenario the direction of rotation changes and it rotates in the negative direction.

The invention claimed is:

1. A monitoring device for a reluctance machine, comprising:
    a vector rotator for rotating a space phasor of the reluctance machine that depends on a voltage into a coordinate system that rotates with a negative fundamental frequency,
    a low-pass filter filtering the rotated space phasor and producing an output signal, and
    a signal evaluation device evaluating the output signal.

2. The monitoring device of claim 1, wherein the space phasor is a voltage phasor.

3. The monitoring device of claim 1, wherein the signal evaluation device comprises an absolute-value generator and a threshold comparator.

4. A method for monitoring a reluctance machine, comprising:
    transforming a space phasor for a flux that depends on a voltage, into a coordinate system that rotates with a negative fundamental frequency;
    producing an output signal by low-pass-filtering the transformed space phasor;
    monitoring a DC value of the produced output signal in the rotating coordinate system; and
    identifying an error in operating the reluctance machine when the DC value is above a predefined threshold value.

5. The method of claim 4, further comprising generating the DC value of the produced output signal with a low-pass filter.

6. The method of claim 4, wherein the reluctance machine is operated without an encoder.

7. The method of claim 4, wherein the reluctance machine is operated with open-loop control.

8. The method of claim 4, wherein the reluctance machine is monitored with a monitoring device configured to:
- rotate with a vector rotator the space phasor of the reluctance machine that depends on the voltage into a coordinate system that rotates with a negative fundamental frequency,
- filter the rotated space phasor with a low-pass filter and producing the output signal, and
- evaluate the output signal with a signal evaluation device to detect the DC value signal of the output signal.

\* \* \* \* \*